(12) United States Patent
Corey

(10) Patent No.: US 7,862,438 B2
(45) Date of Patent: Jan. 4, 2011

(54) UNITIZED DISC PACK AND DISC PACK COUPLING FORMED THEREWITH

(75) Inventor: Dennis J. Corey, Youngsville, PA (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

(21) Appl. No.: 12/646,463

(22) Filed: Dec. 23, 2009

(65) Prior Publication Data

US 2010/0099505 A1    Apr. 22, 2010

Related U.S. Application Data

(62) Division of application No. 11/374,348, filed on Mar. 13, 2006.

(51) Int. Cl.
*F16D 3/77* (2006.01)

(52) U.S. Cl. ...................................................... 464/99

(58) Field of Classification Search ................... 464/69, 464/98, 99
See application file for complete search history.

(56) References Cited

U.S. PATENT DOCUMENTS

| | | | |
|---|---|---|---|
| 1,454,087 A * | 5/1923 | Thomas | ........................ 464/99 |
| 3,500,660 A | 3/1970 | Anderson | |
| 3,654,775 A | 4/1972 | Williams | |
| 4,055,966 A | 11/1977 | Fredericks | |
| 4,744,783 A | 5/1988 | Downey et al. | |
| 4,796,742 A | 1/1989 | Etchell | |
| 5,221,232 A | 6/1993 | Nameny | |
| 5,888,140 A | 3/1999 | Klingler et al. | |
| 6,312,339 B1 | 11/2001 | Bevert | |

FOREIGN PATENT DOCUMENTS

| | | |
|---|---|---|
| DE | 93 05 154 U1 | 6/1993 |
| GB | 546 351 A | 7/1942 |
| GB | 704 041 A | 2/1954 |

OTHER PUBLICATIONS

TSCHAN Installation and Operation Manual, Torsionally Rigid Coupling, Feb. 2004.
Rex Couplings, Thomas Axial Slide Disc Coupling, 2004.
Rex Couplings, Thomas Flexible Disc Couplings, 2003.

* cited by examiner

*Primary Examiner*—Greg Binda
(74) *Attorney, Agent, or Firm*—Quarles & Brady LLP

(57) ABSTRACT

A unitized disc pack for use in a disc pack coupling includes at least two coaxial discs forming a disc pack. The disc pack defines a first axially outwardly facing face and a second axially outwardly facing face facing away from the first outwardly facing face, and includes a plurality of axially aligned holes formed through said disc pack. A first flanged bushing including a flange extends into one of the holes formed through the disc pack. The first flanged bushing is inserted into the one of the holes from the first outwardly facing face of the disc pack. The first flanged bushing flange engages the first outwardly facing face of the disc pack. A second flanged bushing including a flange extends into one of the holes formed through the disc pack. The second flanged bushing is inserted into the one of the holes from the second outwardly facing face of the disc pack. The second flanged bushing flange engages the second outwardly facing face of the disc pack, such that the discs are sandwiched between the flanges of the first and second flanged bushings.

6 Claims, 4 Drawing Sheets

UNITIZED DISC PACK AND DISC PACK COUPLING FORMED THEREWITH

CROSS REFERENCES TO RELATED APPLICATIONS

This application is a divisional application of U.S. patent application Ser. No. 11/374,348 filed on Mar. 13, 2006, which is fully incorporated herein by reference.

STATEMENT REGARDING FEDERALLY SPONSORED RESEARCH

Not Applicable.

BACKGROUND OF THE INVENTION

This invention relates to shaft couplings, and more particularly, to disc pack couplings for transmitting torque between two shafts approximately aligned on a shaft axis.

Flexible disc pack couplings, such as Thomas Flexible Disc Couplings sold by Rexnord Industries, Inc., Milwaukee, Wis., are known in the art for transmitting torque between adjacent generally axially aligned first and second shafts. These couplings typically include a plurality of stacked coaxial discs interposed between a pair of hubs. A first hub is fixed to one end of the first shaft, and a second hub facing the first hub is fixed to the adjacent end of the second shaft. A plurality of first bolts extending through holes formed through the first hub extends through holes formed in the disc pack and oversized holes formed through the second hub to fix the disc pack to the first hub. A plurality of second bolts extending through holes formed through the second hub extends through holes formed in the disc pack and oversized holes formed through the first hub to fix the disc pack to the second hub.

The stacked discs include a plurality of inner discs sandwiched between a pair of outermost discs to form a disc pack. The pack can be formed at the time of installation by gathering and aligning a desired number of individual discs. Alternatively, the discs can be provided as a unitized pack of discs joined together. In one embodiment, a unitized pack is formed by pressing bushings in the holes formed through the discs. The bushings are fixed in the holes by an interference fit, and the discs are held together by the frictional engagement with the bushings. The bushings are installed from both sides of the disc pack in an alternating sequence to prevent an undesirable situation that can occur if the bushings are installed from the same side, wherein the outermost discs in the pack could slip off the end of the bushings, complicating the installation of the disc pack between the hubs.

Installation of the discs between the hubs includes inserting a washer aligned with each hole in the disc pack between the disc pack and a nut tightened on the bolt while holding the disc pack holes aligned with holes formed in the hubs and inserting a bolt through the aligned disc pack holes, hub holes, and washers. This is very difficult to do, especially when one or more of the outermost discs slips off the end of a bushing when attempting to maintain all of the components in alignment in order to insert a bolt through the holes formed in the components. Accordingly, a need exists for an improved unitized disc pack that simplifies the installation procedure.

SUMMARY OF THE INVENTION

The present invention provides a coupling for transmitting torque between two shafts approximately aligned on a shaft axis, and a unitized disc pack for use in the coupling, that is easy to install. The unitized disc pack includes at least two coaxial discs forming a disc pack. The disc pack defines a first axially outwardly facing face and a second axially outwardly facing face facing away from the first outwardly facing face, and includes a plurality of axially aligned holes formed through said disc pack. A first flanged bushing including a flange extends into one of the holes formed through the disc pack. The first flanged bushing is inserted into the one of the holes from the first outwardly facing face of the disc pack. The first flanged bushing flange engages the first outwardly facing face of the disc pack. A second flanged bushing including a flange extends into one of the holes formed through the disc pack. The second flanged bushing is inserted into the one of the holes from the second outwardly facing face of the disc pack. The second flanged bushing flange engages the second outwardly facing face of the disc pack, such that the discs are sandwiched between the flanges of the first and second flanged bushings.

A general objective of the present invention is to prevent individual discs from separating from the disc pack. This objective is accomplished by inserting flanged bushings into holes formed through the disc pack from opposite faces of the disc pack, such that the discs are sandwiched between the flanges of the flanged bushings.

Another objective of the present invention is to simplify installation of a disc pack coupling. This objective is accomplished by inserting flanged bushings into holes formed through the disc pack to eliminate the need for a washer typically used between the disc pack and a bolt securing the disc pack to one of the hubs.

The foregoing and other objects and advantages of the invention will appear from the following description. In the description, reference is made to the accompanying drawings which form a part hereof, and in which there is shown by way of illustration a preferred embodiment of the invention.

Figure 1:
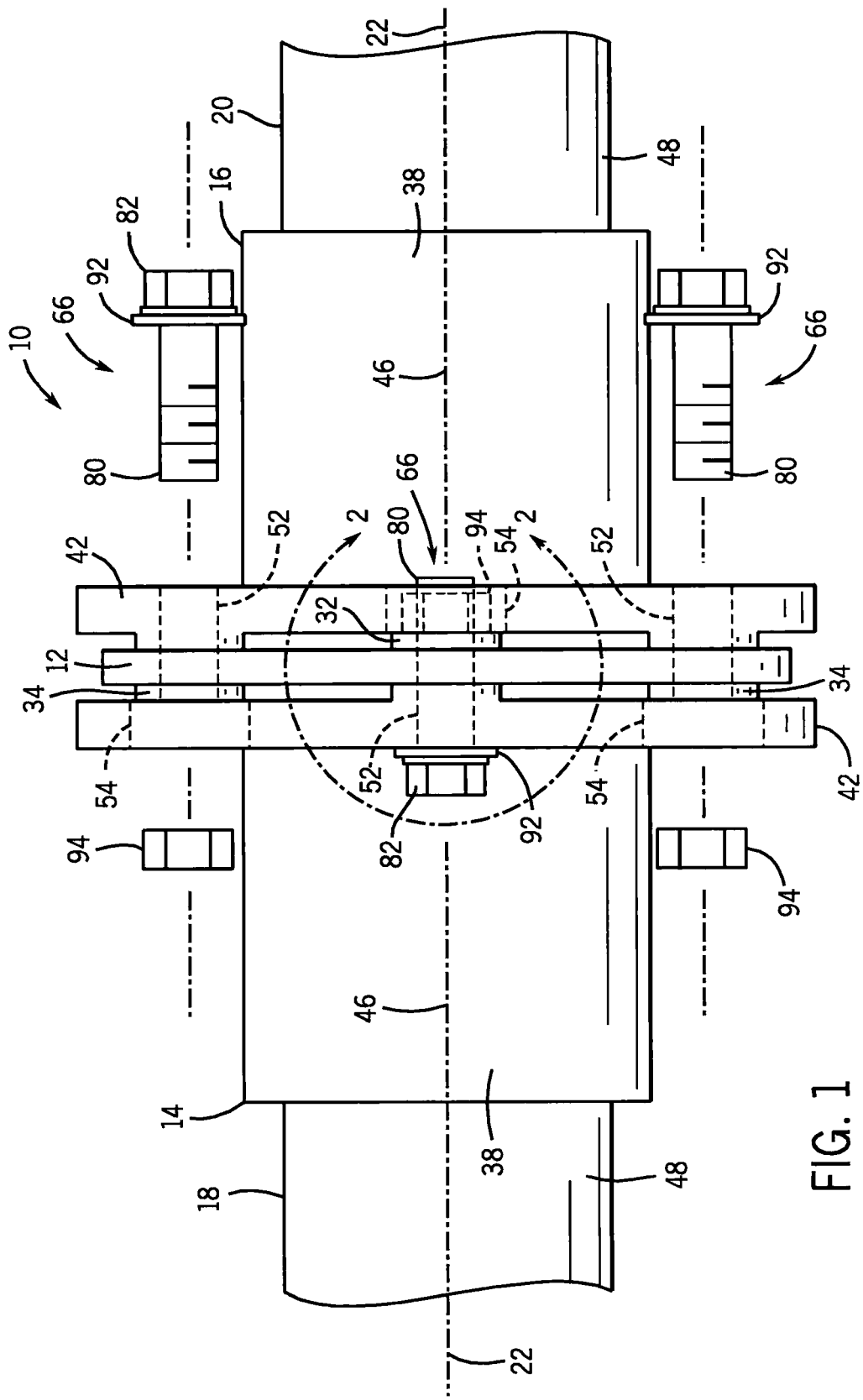
FIG. 1 is a side view of a coupling incorporating the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

As shown in FIGS. 1-4, a disc pack coupling 10 incorporating the present invention includes a unitized disc pack 12 interposed between a pair of hubs 14, 16 that transmit torque between two shafts 18, 20 approximately aligned on a shaft axis 22. The unitized disc pack 12 includes a plurality of discs 26a, 26b, 26c, 26d, 26e, 26f, 26g, 26h uniquely joined together using unitizing flanged bushings 32, 34 to maintain the integrity of the disc pack 12 and simplify installation of the coupling 10.

Each hub 14, 16 includes a cylindrical body 38 having a radially extending flange 42 formed at one end 44, and is rotatable about a hub axis 46. The body 38 of each hub 14, 16 is rotatably fixed to an end 48 of one of the shafts 18, 20 substantially coaxially with the shaft 18, 20 using methods known in the art, such as welding, mechanical fasteners, keys, threads, and the like, for transmitting torque between the hub 14, 16 and respective shaft 18, 20. Preferably, the hubs 14, 16 are formed from machined metal castings, such as steel.

A plurality of circumferentially spaced hub holes 52, 54 are formed through the flange 42 parallel to the hub axis 46. A first set of the hub holes 52 has a first diameter, and a second set of the hub holes 54 has a second diameter that is larger than the first diameter. Preferably, the first set of the hub holes 52 circumferentially alternate with the second set of hub holes 54, such that each hub hole 52 of the first set of hub holes 52 is between hub holes 54 of the second set of hub holes 54. Each hub hole 52 of the first set of hub holes 52 in one of the hubs 14 is aligned with one hub hole 54 of the second set of hub holes 54 in the other hub 16, such that the aligned hub holes 52, 54 in the hubs 14, 16 have different diameters to form a pair of aligned hub holes 52, 54.

Figure 2:
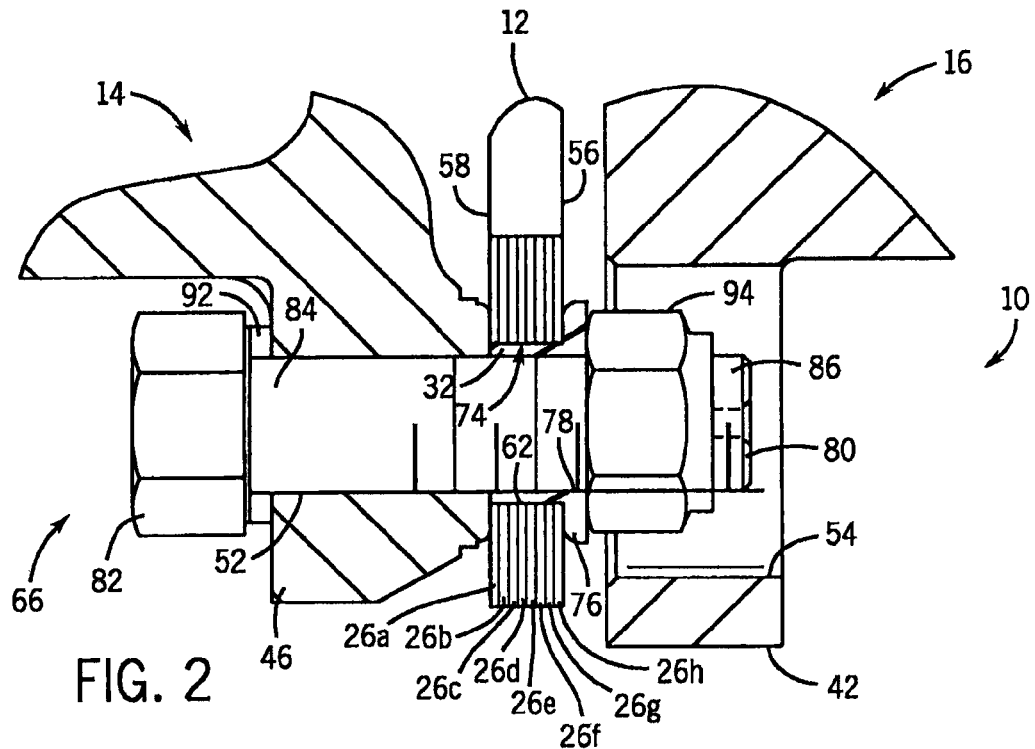
FIG. 2 is a sectional view along line 2-2 of FIG. 1.
Figure 4:
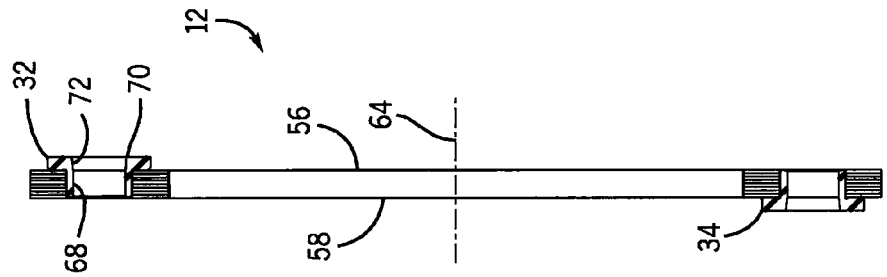
FIG. 4 is sectional view along line 4-4 of FIG. 3.
Figure 3:
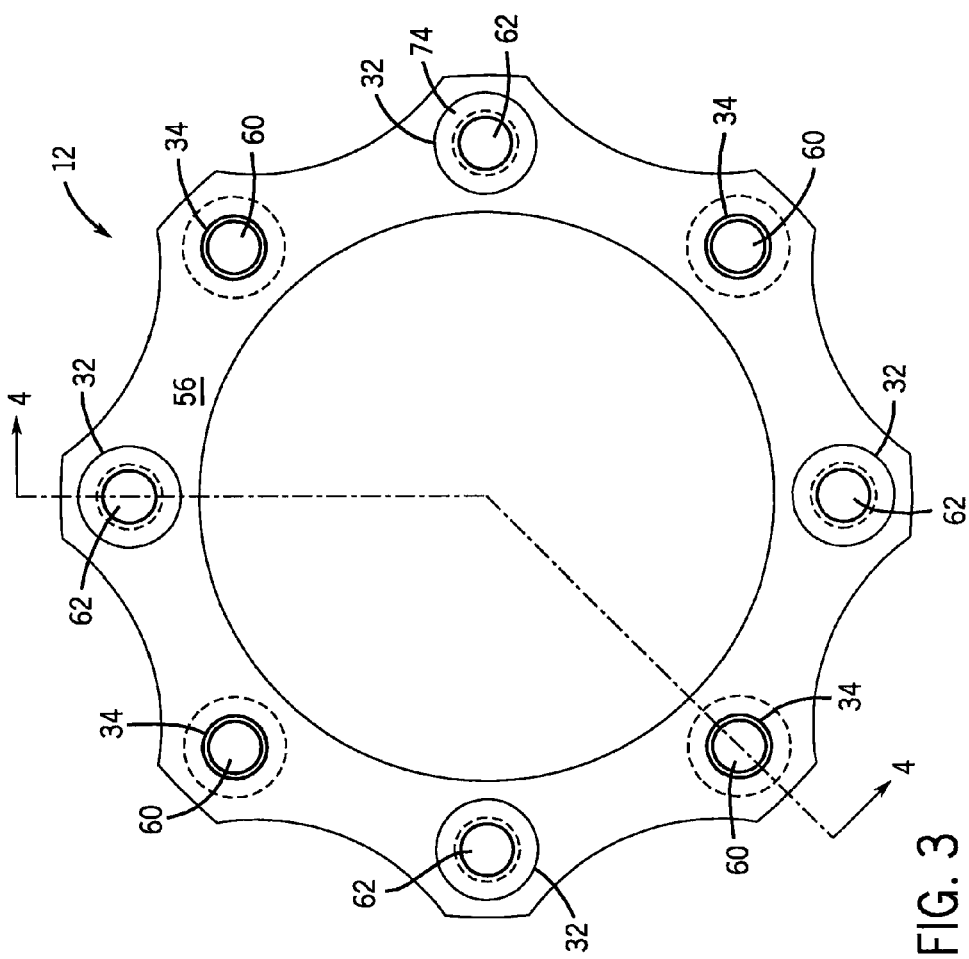
FIG. 3 is a plan view of one embodiment of a disc pack incorporating the present invention for use in the coupling of FIG. 1.

Referring now to FIGS. 2-4, the unitized disc pack 12 is interposed between the hubs 14, 16, and is formed from the plurality of coaxial discs 26a-26h forming the disc pack 12. Preferably, the disc pack 12 includes eight to twelve discs stamped from a sheet of stainless or carbon steel. However, two or more discs formed from any suitable material can be used without departing from the scope of the invention. The plurality of discs 26a-26h include inner discs 26b-26g sandwiched between a pair of outer discs 26a, 26h. Each outer disc 26a, 26h defines an axially outwardly facing face 56, 58 of the disc pack 12 facing the adjacent hub 14, 16. A plurality of circumferentially spaced disc pack holes 60, 62 are formed through the disc pack 12, and extend substantially parallel to a disc axis 64 substantially coaxial with the hub axes 46. Each disc pack hole 60, 62 is aligned with a pair of the aligned hub holes 52, 54 for receiving a bolt 66 therethrough.

The discs 26a-26h are held together by the unitizing flanged bushings 32, 34 having a cylindrical body 74 with a radially extending flange 76 extending from a proximal end 78 of the cylindrical body 74. The cylindrical body 74 has an outer diameter slightly larger that the diameter of the disc pack holes 60, 62, such that insertion of the cylindrical body 74 into one of the disc pack holes 60, 62 creates an interference fit between the unitizing flanged bushing 32, 34 and at least some of the discs 26a-26h. Although pressing the unitizing flanged bushings 32, 34 into the disc pack holes 60, 62 to create an interference fit is preferred because of the low cost and ease of assembly, the unitizing flanged bushings 32, 34 can be fixed in the disc pack holes 60, 62 using any methods known in the art, such as by adhesives, threadably engaging the unitizing flanged bushings 32, 34 with the disc pack 12, and the like without departing from the scope of the invention.

The cylindrical body 74 of the each unitizing flanged bushing 32, 34 defines an inside diameter 68 through which the bolt 66 is received therethrough. A leading edge 70 of the inside diameter 68 includes a chamfer 72 to facilitate use of the unitizing flanged bushing 32, 34 with a commonly used stretched bolt circle diameter when the bolt is received through the unitizing bushing 32, 34 from the direction of the flange 76. A stretched bolt circle is when the hub holes 52, 54 in the hub 14, 16 are positioned on a slightly larger bolt circle than the disc pack holes 60, 62 in the disc pack 12 to eliminate "oil canning" and/or "axial shuttling" of the flexing elements of the coupling 10. The stretched bolt circle, however, requires stretching the disc pack 12 during assembly, and the bolts 66 need to engage the unitizing bushing 32, 34 at a slight angle. Advantageously, the chamfer 72 guides the bolt 66 through the inside diameter 68 of the unitizing flanged bushing 32, 34 to simplify installation of the coupling 10 when a stretched bolt circle is used. Of course, if a stretched bolt circle is not used, the chamfer 72 can be eliminated without departing from the scope of the invention. Moreover, if the bolt 66 is received through the unitizing bushing 32, 34 from the end of the cylindrical body 74 opposite of the flange 76, the chamfer 72 can be formed at the end of the cylindrical body 74 opposite of the flange 76 without departing from the scope of the invention.

Importantly, the discs 26a-26h are sandwiched between flanges 76 of two or more of the flanged bushings 32, 34 inserted from the opposite axially outwardly facing faces 56, 58 of the disc pack 12 to hold the discs 26a-26h together. The flange 76 of the unitizing flanged bushing 32, 34 has an outer diameter greater than the disc pack hole 60, 62, such that the flange 76 engages one of the axially outwardly facing faces 56, 58 of the disc pack 12 to prevent further insertion of the cylindrical body 74 of the unitizing flanged bushing 32, 34 into the disc pack hole 60, 62, and to prevent the discs 26a-26h from slipping off of the proximal end 78 of the unitizing flanged bushings 32, 34.

In the embodiment disclosed in FIG. 2, the flanged bushing cylindrical body 74 extends into the disc pack hole 62 from one of the axially outwardly facing face 56 of the disc pack 12 to a point short of the other axially outwardly facing face 58 of the disc pack 12. In this preferred embodiment, the bushing 32 frictionally engages all of the discs 26a-26h in the disc pack 12 without extending past the other axially outwardly facing face 56, 58 of the disc pack 12. However, the bushing 32 can extend any distance into the disc pack hole 62, such as all the way through, at least two-thirds, at least more that one-half, and the like, in order to frictionally engage more than half of the discs 26a-26h forming the disc pack 12 without departing from the scope of the invention. Preferably, the bushings 32, 34 are formed from stainless or carbon steel. Of course, the bushings 32, 34 can be formed from other suitable materials, such as brass, aluminum, plastic, and the like, without departing from the scope of the invention.

In a preferred embodiment shown in FIGS. 1-4, a first set of the unitizing flanged bushings 32 extends through a first set of the holes 62 formed through said disc pack 12, and are inserted through the first set of holes 62 from one axially outwardly facing face 56 of the disc pack 12. A second set of the unitizing flanged bushings 34 extends through a second set of the holes 60 formed through the disc pack 12, and are inserted through the second set of holes 60 from the other outwardly facing face 58 of the disc pack 12, such that the discs 26a-26h are sandwiched between the flanges 76 of the first and second set of unitizing flanged bushings 32, 34. Advantageously, the alternating orientation of the unitizing flanged bushings 32, 34 provides a flat surface on the opposite axially outwardly facing face 56, 58 of the disc pack 12, with which the disc pack 12 can mount directly to a flange containing a "cast-in-place washer" feature.

In the embodiment disclosed herein, the sum of the first and second sets of flanged bushings 32, 34 is at least equal to the number of holes 60, 62 formed through the disc pack 12. However, each set of flanged bushings 32, 34 can include one or more flanged bushings 32, 34, and the sum of the bushings 32, 34 of the first and second sets of flanged bushings 32, 34 can be less than the number of holes 60, 62 formed through the disc pack 12 without departing from the scope of the invention. Preferably, the first set of holes 62 formed through the disc pack 12 alternate with the second set of holes 60 formed through the disc pack 12, such that each hole 62 of the first set of holes 62, and thus each flanged bushing 32 of the first set of flanged bushings 32, is between holes 60 of the second set of holes 60, and thus each flanged bushing 34 of the second set of flanged bushings 34. Most preferably, the unitized disc pack 12 is positioned between the hubs 14, 16, and the flange 76 of each of the flanged bushings 32, 34 extend toward, or even into, one of the second set of holes 54 formed through the hub flange 42.

The unitized disc pack 12 is fixed to the hubs 14, 16 using the bolts 66 extending through the aligned holes 52, 54, 62 or 52, 54, 60 formed through the hubs 14, 16 and disc pack 12. As shown in FIG. 4, each bolt includes a bolt head 82 formed at a proximal end 84 of a threaded bolt body 86. Preferably, the bolts 66 are alternately inserted from opposite sides of the disc pack 12 through aligned holes 52, 54, 62 or 52, 54, 60, such that the bolt head 82 engages the flange 76 extending toward the hole 54 of a second set of holes 54 formed through the hub flange 42.

As shown in FIG. 2, the disc pack 12 is fixed to the hub 14 by inserting a distal end 80 of the bolt body 86 through a washer 92 aligned with one of the holes 52 of the first set of holes 52 formed through the flange 42 of the hub 14 and into the one of the holes 52 of the first set of holes 52 formed through the flange 42 of the hub 14. The bolt 66 is further inserted in a direction of bolt insertion through one of the bushings 32 received in one of the holes 62 of the disc pack 12 from the axially outwardly facing face 56 of the disc pack 12 which faces in the direction of bolt 66 insertion, past the flange 76 of the bushing 32, and into one of the holes 54 of the second set of holes 54 formed through the flange 42 of the other hub 16. A nut 94 threadably engaging the bolt body 86 is received in the one of the holes 54 of the second set of holes 54 formed through the flange 42 of the other hub 16, and is tightened against the flange 76 of the flanged bushing 32 to fix the disc pack 12 to the hub 14. Advantageously, the flange 76 of the flanged bushing 32 eliminates the need for a washer between the nut 94 and disc pack 12.

The disc pack 12 is fixed to the other hub 16 by inserting a distal end 80 of the bolt body 86 of another bolt 66 through a washer 92 aligned with one of the holes 52 of the first set of holes 52 formed through the flange 42 of the other hub 16 and through the one of the holes 52 of the first set of holes 52 formed through the flange 42 of the other hub 16. In a direction of bolt insertion opposite to the direction of bolt insertion for the bolt fixing the disc pack 12 to the first hub 14, the bolt 66 is further inserted through one of the bushings 34 received in one of the holes 60 of the disc pack 12 from the axially outwardly facing face 58 of the disc pack 12 past the flange 76 of the bushing 34, and into one of the holes 54 of the second set of holes 54 formed through the flange 42 of the first hub 14. A nut 94 threadably engaging the bolt body 86 is received in the one of the holes 54 of the second set of holes 54 formed through the flange 42 of the first hub 14, and is tightened against the flange 76 of the flanged bushing 34 to fix the disc pack 12 to the other hub 16. Advantageously, as with flanged bushing 32, the flange 76 of flanged bushing 34 eliminates the need for a washer between the nut 94 and disc pack 12. Although inserting bolts 66 through the aligned holes 52, 62, 54 in a first bolt direction to fix the hub 14 to the disc pack 12 and inserting bolts 66 through the aligned holes 52, 60, 54 in a second bolt direction opposite to the first bolt direction to fix the hub 16 to the disc pack 12 is described, the bolts 66 can all be inserted in the same direction without departing from the scope of the invention.

Figure 5:
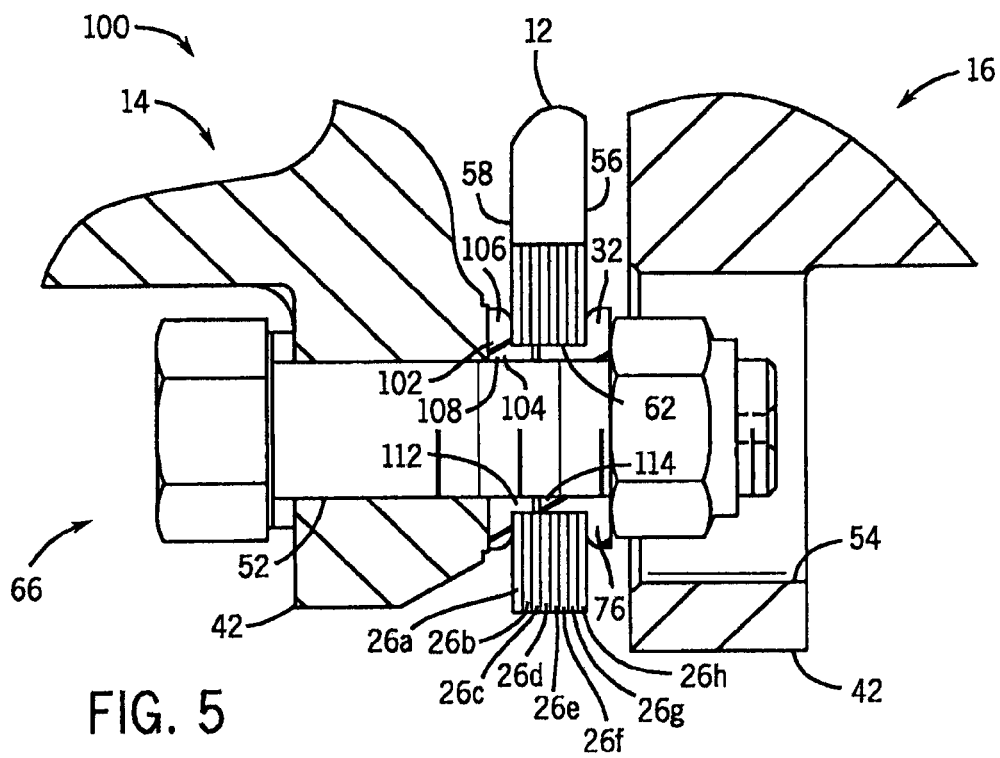
FIG. 5 is a sectional view of an alternative embodiment of a coupling incorporating the present invention.

In another embodiment disclosed in FIG. 5, a coupling 100 includes a disc pack 12 having a capping flanged bushing 102 received in an opposite end of a disc pack hole 62 receiving one of the unitizing flanged bushings 32, 34. The capping flanged bushing 102 includes a cylindrical body 104 with a radially extending flange 106 extending from one end 108 of the cylindrical body 104. The cylindrical body 104 has an outer diameter slightly larger that the diameter of the disc pack hole 62, such that insertion of the cylindrical body 104 into the disc pack hole 62 creates an interference fit between the capping flanged bushing 102 and the disc pack hole 62.

As shown in FIG. 5, the cylindrical body 104 of the capping flanged bushing 102 is inserted into the disc pack hole 62 from the axially outwardly facing faces 58 of the disc pack 12 in which a unitizing flanged bushing 32 has already been inserted into the disc pack hole 62 from the other axially outwardly facing face 56 of the disc pack 12. The capping flanged bushing cylindrical body 104 is pressed into the disc pack hole 62 to frictionally engage at least some of the discs 26a, 26b, 26c in the disc pack 12 not engaged by the unitizing flanged bushings 32 in an interference fit to more securely hold the discs 26a-26h together. The flange 106 of the capping flanged bushing 102 has an outer diameter greater than the disc pack hole 62, such that the flange 106 engages the axially outwardly facing faces 58 of the disc pack 12 to prevent further insertion of the cylindrical body 104 of the capping flanged bushing 102 into the disc pack hole 62.

The capping flanged bushing 102 is shorter than the unitizing flanged bushings 32, 34 since the unitizing flanged bushing 32, 34 extend at least more than halfway into the disc pack hole 62. Preferably, the unitizing flanged bushings 32, 34 extends approximately two-thirds of the way into the disc pack hole 62 from one of the axially outwardly facing faces 56, 58 of the disc pack 12, and the capping flanged bushing 102 extends approximately one-third of the way into the same disc pack hole 62 from the other axially outwardly facing face 56, 58 of the disc pack 12. Of course the length of the capping flanged bushing 102 can vary, and is dependent upon the length of the unitizing flanged bushing 32, 34 with which the disc pack hole 62 is shared.

In the embodiment disclosed in FIG. 5, the distal end 112 of the capping flanged bushing 102 inserted into the disc pack hole 62 is spaced from the distal end 114 of the unitizing flanged bushing 32. In an alternative embodiment, however, the distal ends 112, 114 of the capping and unitizing flanged bushing 32, 102 can be locked together using adhesives, interfitting or locking shapes, such as threads, and the like, without departing from the scope of the invention. Although FIG. 5 shows a capping flanged bushing 102 in the same disc pack hole 62 as the unitizing flanged bushing 32 inserted into the disc pack hole 62 from the axially outwardly facing face 56 of the disc pack 12, it is understood that the capping flanged bushing 102 can also be received in the same disc pack hole 60 as the unitizing flanged bushing 34 inserted into the disc pack hole 60 from the axially outwardly facing face 58 of the disc pack 12.

Figure 6:
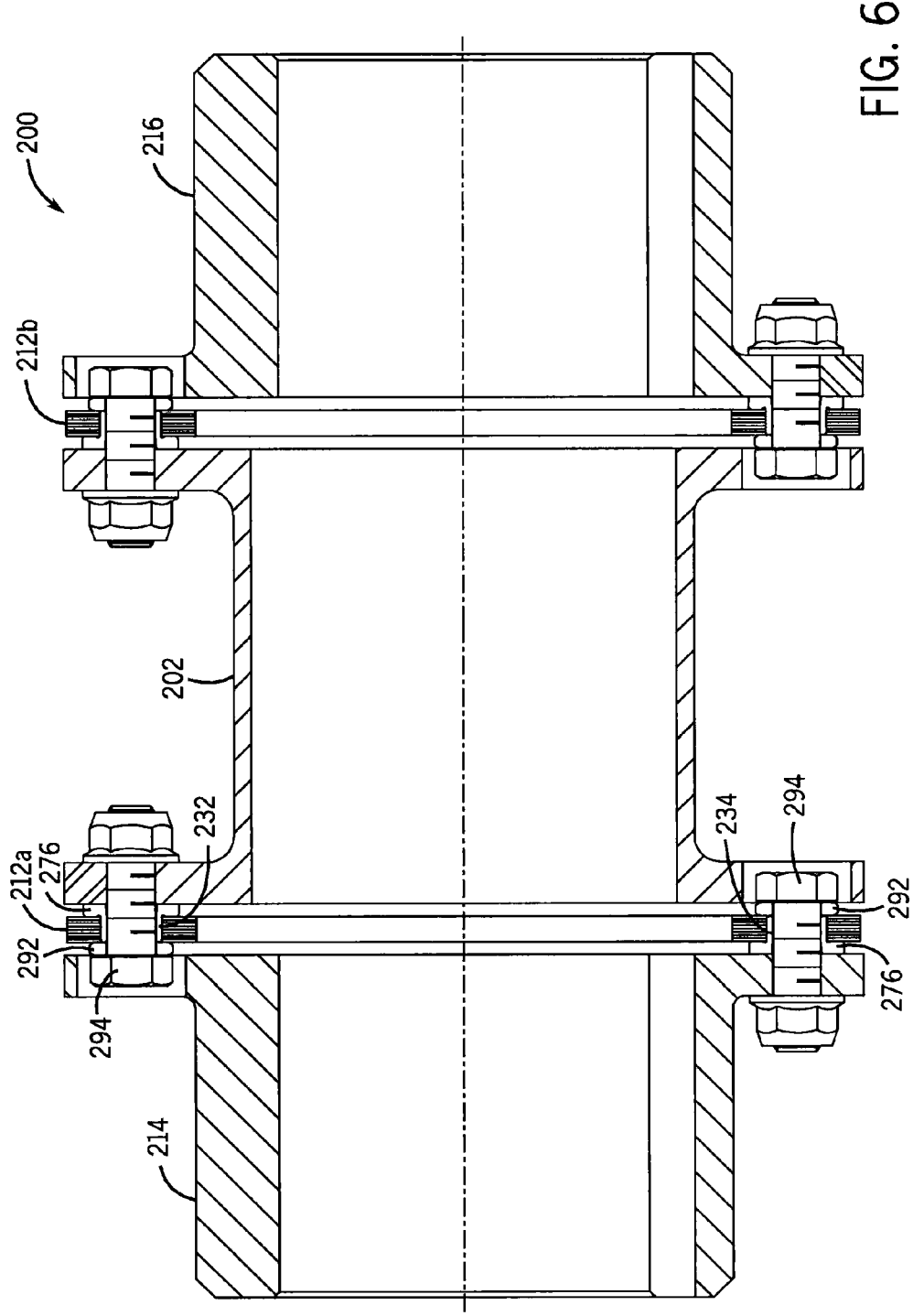
FIG. 6 is another alternative embodiment of a coupling incorporating the present invention.

In the embodiment disclosed in FIG. 6, a spacer coupling 200 incorporating the present invention includes a flanged spacer 202 interposed between disc packs 212a, 212b, such as described above, connected to hubs 214, 216, such as described above. In this particular embodiment, the hub 16 described above is defined as including hub 216, disc pack 212b, and the spacer 202. In addition, a flange 276 of the unitizing flanged bushings 232 engages the spacer 202, and a washer 292 is interposed between the nut 294 and the disc pack 212a. Likewise, a flange 276 of the unitizing flanged bushings 234 engages the hub 214, and a washer 292 is interposed between the nut 294 and the disc pack 212a While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

I claim:

1. A disc pack coupling comprising:
a first hub fixable to an end of a first shaft, and having circumferentially spaced first and second holes formed therethrough, said first set of holes having a first diameter, and said second set of holes having a second diameter;
a second hub fixable to an end of a second shaft, and having circumferentially spaced first and second holes formed therethrough, said first set of holes having a first diameter, and said second set of holes having a second diameter, said first set of holes of said first hub having a diameter that is less than said second diameter, said second set of holes of said first hub having a diameter that is greater than said first diameter, and at least some of said first set of holes of said first hub being aligned with said second set of holes of said second hub, and at least some of said second set of holes of said first hub being aligned with said first set of holes of said second hub;
a unitized disc pack including at least three coaxial discs interposed between said first and second hubs, and including circumferentially spaced holes formed through said disc pack and aligned with at least some of said holes of said first and second hubs that are aligned, said disc pack defining a first axially outwardly facing face and a second axially outwardly facing face facing away from said first outwardly facing face, a first flanged bushing extending into one of said holes formed through said disc pack, said first flanged bushing being inserted into said one of said holes from said first outwardly facing face of said disc pack to frictionally engage less than all of said at least three coaxial discs and more than half of said at least three coaxial discs, said first flanged bushing including a flange engaging said first outwardly facing face of said disc pack, and a second flanged bushing extending into another of said holes formed through said disc pack, said second flanged bushing being inserted into said another of said holes from said second outwardly facing face of said disc pack to frictionally engage less than all of said at least three coaxial discs and at least one of said at least three coaxial discs, said second flanged bushing including a flange engaging said second outwardly facing face of said disc pack, such that said discs are sandwiched between said flanges of said first and second flanged bushings and held together by said first and second flanged bushings prior to installation in said disc pack coupling.

2. The disc pack coupling as in claim 1, in which each of said first and second flanged bushings are fixed in said holes formed through said disc pack by an interference fit.

3. The disc pack coupling as in claim 1, in which said first and second flanged bushings are received in adjacent holes formed through said disc pack.

4. The disc pack coupling as in claim 1, in which said first hub is fixed relative to said disc pack by a first bolt extending in one direction, and said second hub is fixed relative to said disc pack by a second bolt extending in an opposite direction.

5. The disc pack coupling as in claim 1, in which said first hub includes a spacer connected to a third hub.

6. The disc pack coupling as in claim 5, in which a second disc pack is interposed between said spacer and said third hub.

* * * * *